(12) United States Patent
Nakamura et al.

(10) Patent No.: US 11,787,398 B2
(45) Date of Patent: Oct. 17, 2023

(54) DRIVING ASSIST SYSTEM

(71) Applicant: Toyota Jidosha Kabushiki Kaisha, Toyota (JP)

(72) Inventors: Satoshi Nakamura, Susono (JP); Kazuyuki Fujita, Gotemba (JP); Minami Sato, Ebina (JP); Takahisa Awata, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 114 days.

(21) Appl. No.: 17/147,824

(22) Filed: Jan. 13, 2021

(65) Prior Publication Data

US 2021/0261120 A1    Aug. 26, 2021

(30) Foreign Application Priority Data

Feb. 21, 2020   (JP) ................................ 2020-028453

(51) Int. Cl.
*B60W 30/09*     (2012.01)
*B60W 10/04*     (2006.01)
(Continued)

(52) U.S. Cl.
CPC ............ *B60W 30/09* (2013.01); *B60W 10/04* (2013.01); *B60W 10/18* (2013.01); *B60W 10/20* (2013.01);
(Continued)

(58) Field of Classification Search
CPC ...... B60W 30/09; B60W 10/04; B60W 10/18; B60W 10/20; B60W 2552/53; B60W 2554/4029; B60W 2554/80; B60W 2710/06; B60W 2710/08; B60W 2710/18; B60W 2710/20; B60W 2420/42;
(Continued)

(56) References Cited

U.S. PATENT DOCUMENTS

2016/0185345 A1\* 6/2016 Sasabuchi ............. B60W 30/08
                                                                  701/301
2016/0229397 A1\* 8/2016 Muthukumar ........ B60R 21/013
(Continued)

FOREIGN PATENT DOCUMENTS

CN        109249928 A      1/2019
JP         2017182768 A   \* 10/2017
(Continued)

*Primary Examiner* — Jonathan M Dager
*Assistant Examiner* — Jean W Charleston
(74) *Attorney, Agent, or Firm* — Dinsmore & Shohl LLP

(57) ABSTRACT

A driving assist system executes driving assist control for avoiding a collision with a target ahead of a vehicle. The driving assist control operates when the target exists within an assist area. First and second roadway boundaries of a roadway area are located on first and second sides as viewed from the vehicle, respectively. A crossing target is the target crossing the roadway area ahead of the vehicle from the first side toward the second side. The assist area for the crossing target is an area between an assist start boundary located on the first side as viewed from the vehicle and an assist end boundary located on the second side as viewed from the vehicle. The driving assist system sets the assist end boundary at a position between the vehicle and the second roadway boundary of the roadway area.

5 Claims, 20 Drawing Sheets

(51) Int. Cl.
 *B60W 10/18* (2012.01)
 *B60W 10/20* (2006.01)
(52) U.S. Cl.
 CPC . *B60W 2552/53* (2020.02); *B60W 2554/4029* (2020.02); *B60W 2554/80* (2020.02); *B60W 2710/06* (2013.01); *B60W 2710/08* (2013.01); *B60W 2710/18* (2013.01); *B60W 2710/20* (2013.01)
(58) Field of Classification Search
 CPC ........... B60W 2420/52; B60W 30/095; B60W 30/0956; B60W 30/08; B60W 2554/40; B60W 2554/4026
 USPC .......................................................... 701/23
 See application file for complete search history.

(56) References Cited

U.S. PATENT DOCUMENTS

| | | | |
|---|---|---|---|
| 2017/0313297 A1* | 11/2017 | Okada | G05D 1/0246 |
| 2018/0022328 A1* | 1/2018 | Tochigi | G06V 20/56 |
| | | | 701/70 |
| 2018/0056998 A1* | 3/2018 | Benosman | B60W 30/09 |
| 2018/0162387 A1 | 6/2018 | Sung et al. | |
| 2018/0281857 A1* | 10/2018 | Choi | B60W 10/20 |
| 2019/0016316 A1* | 1/2019 | Sung | B60T 7/22 |
| 2019/0367017 A1* | 12/2019 | Goetz | G08G 1/166 |

FOREIGN PATENT DOCUMENTS

| | | |
|---|---|---|
| JP | 2017182768 A | 10/2017 |
| JP | 2018-012360 A | 1/2018 |

\* cited by examiner

DRIVING ASSIST SYSTEM

CROSS-REFERENCE TO RELATED APPLICATIONS

This application claims priority to Japanese Application No. 2020-028453 filed on Feb. 21, 2020, the entire contents of which are herein incorporated by reference.

BACKGROUND

Technical Field

The present disclosure relates to driving assist control that assists driving of a vehicle. In particular, the present disclosure relates to the driving assist control for avoiding a collision with a target ahead of the vehicle.

Background Art

Patent Literature 1 discloses a travel assist device that assists avoidance of collision between a vehicle and an object such as a pedestrian. The travel assist device determines whether an object detected based on a camera or a radar exists in a roadway area or a sidewalk area. The roadway area is set based on a detection position of a curb, a guardrail, or the like. When the object exists in the roadway area, an assist range is set to be larger than that when the object exists in the sidewalk area. When a future position of the object is included in the assist range, the travel assist device performs collision avoidance control in order to avoid a collision with the object.

LIST OF RELATED ART

Patent Literature 1: Japanese Laid-Open Patent Application Publication No. JP-2018-012360

SUMMARY

Driving assist control for avoiding a collision with a target ahead of a vehicle will be considered. In particular, the driving assist control with respect to a "crossing target" that crosses a roadway area ahead of the vehicle will be considered. A direction of movement of the crossing target at a first timing is a direction toward the vehicle, and a direction of movement of the crossing target at a second timing is a direction away from the vehicle. A possibility of collision with the crossing target at the second timing is significantly lower than that at the first timing. If the driving assist control is uniformly performed without considering such the difference, the driving assist control may operate unnecessarily even in the case of the low possibility of collision.

An object of the present disclosure is to provide a technique capable of suppressing an unnecessary operation of driving assist control for avoiding a collision with a crossing target ahead of a vehicle.

A first aspect relates to a driving assist system that assists driving of a vehicle. The driving assist system includes: a memory configured to store driving environment information indicating a driving environment for the vehicle; and a processor configured to execute driving assist control including at least one of deceleration control and steering control for avoiding a collision with a target ahead of the vehicle based on the driving environment information. The driving assist control operates when the target exists within an assist area and does not operate when the target exists outside the assist area. A roadway area in which the vehicle exists is an area between a first roadway boundary located on a first side as viewed from the vehicle and a second roadway boundary located on a second side opposite to the first side as viewed from the vehicle. A crossing target is the target that crosses the roadway area ahead of the vehicle from the first side toward the second side. The assist area for the crossing target is an area between an assist start boundary located on the first side as viewed from the vehicle and an assist end boundary located on the second side as viewed from the vehicle. The processor is further configured to set the assist end boundary at a position between the vehicle and the second roadway boundary.

According to the first aspect, the assist end boundary of the assist area for the crossing target is set at the position between the vehicle and the second roadway boundary. In other words, the assist area that exists on the second side as viewed from the vehicle is set to be narrower than that in a case where the assist end boundary is the second roadway boundary. As a result, a period of time in which the driving assist control operates with respect to the crossing target moving in a direction away from the vehicle becomes relatively short. That is, an unnecessary operation of the driving assist control with respect to the crossing target having a low possibility of collision is suppressed. Since the unnecessary operation of the driving assist control is suppressed, a sense of strangeness or a sense of annoyance felt by an occupant of the vehicle is reduced.

A second aspect relates to a driving assist system that assists driving of a vehicle. The driving assist system includes: a memory configured to store driving environment information indicating a driving environment for the vehicle; and a processor configured to execute driving assist control including at least one of deceleration control and steering control for avoiding a collision with a target ahead of the vehicle based on the driving environment information. The driving assist control operates when the target exists within an assist area and does not operate when the target exists outside the assist area. A roadway area in which the vehicle exists is an area between a first roadway boundary located on a first side as viewed from the vehicle and a second roadway boundary located on a second side opposite to the first side as viewed from the vehicle. A crossing target is the target that crosses the roadway area ahead of the vehicle from the first side toward the second side. The assist area for the crossing target is an area between an assist start boundary located on the first side as viewed from the vehicle and an assist end boundary located on the second side as viewed from the vehicle. A first assist width is a distance between the vehicle and the assist start boundary. A second assist width is a distance between the vehicle and the assist end boundary. The processor is further configured to set the assist area for the crossing target such that the second assist width is smaller than the first assist width.

According to the second aspect, the assist area for the crossing target is set such that the second assist width is smaller than the first assist width. In other words, the assist area on the second side as viewed from the vehicle is set to be narrower than the assist area on the first side as viewed from the vehicle. As a result, a period of time in which the driving assist control operates with respect to the crossing target moving in a direction away from the vehicle becomes relatively short. That is, an unnecessary operation of the driving assist control with respect to the crossing target having a low possibility of collision is suppressed. Since the unnecessary operation of the driving assist control is suppressed, a sense of strangeness or a sense of annoyance felt by an occupant of the vehicle is reduced.

According to the present disclosure, it is possible to suppress the unnecessary operation of the driving assist control for avoiding the collision with the crossing target ahead of the vehicle. Since the unnecessary operation of the driving assist control is suppressed, the sense of strangeness or the sense of annoyance felt by the occupant of the vehicle is reduced.

DETAILED DESCRIPTION

Embodiments of the present disclosure will be described with reference to the accompanying drawings.

1. First Embodiment

1-1. Outline

Figure 1:
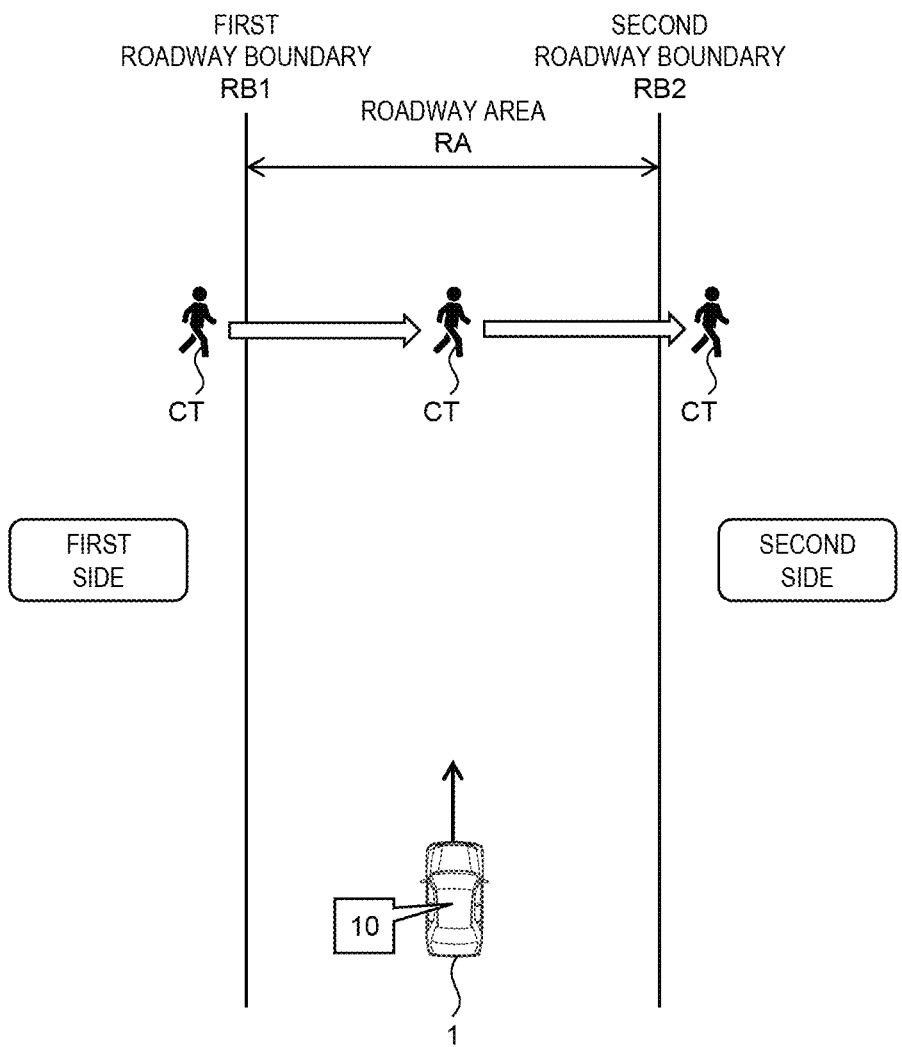
FIG. 1 is a conceptual diagram for explaining an outline of a driving assist system according to a first embodiment of the present disclosure.

FIG. 1 is a conceptual diagram for explaining an outline of a driving assist system 10 according to the present embodiment. The driving assist system 10 performs "driving assist control" that assists driving of a vehicle 1. The driving assist control may be included in automated driving control for controlling automated driving of the vehicle 1. Typically, the driving assist system 10 is installed on the vehicle 1. Alternatively, at least a part of the driving assist system 10 may be disposed in an external device outside the vehicle 1 and remotely perform the driving assist control. That is, the driving assist system 10 may be distributed in the vehicle 1 and the external device.

In the present embodiment, the driving assist control for avoiding a collision with a target ahead of the vehicle 1 (i.e., collision avoidance control, risk avoidance control) will be considered. Examples of the target to be avoided include a pedestrian, a bicycle, a motorcycle, another vehicle (a preceding vehicle, a parked vehicle, and the like), an animal, a fallen object, and the like. The driving assist control for avoiding a collision with the target ahead of the vehicle 1 includes at least one of deceleration control and steering control. That is, the driving assist system 10 automatically performs at least one of the deceleration and the steering of the vehicle 1 in order to avoid a collision with the target ahead of the vehicle 1.

The target to be avoided typically exists in or near a roadway ahead of the vehicle 1. In the present embodiment, a target crossing a roadway ahead of the vehicle 1 is considered in particular. The target crossing the roadway ahead of the vehicle 1 is hereinafter referred to as a "crossing target CT". Examples of such the crossing target CT include a pedestrian, a bicycle, an animal, and the like.

In order to describe the crossing target CT in more detail, a roadway area RA will be first described. As shown in FIG. 1, the vehicle 1 exists in the roadway area RA. The roadway area RA is an area between a first roadway boundary RB1 and a second roadway boundary RB2. The first roadway boundary RB1 is one boundary of the roadway area RA, and is located on a first side (the left side in the example shown in FIG. 1) as viewed from the vehicle 1. The second roadway boundary RB2 is the other boundary of the roadway area RA, and is located on a second side (the right side in the example shown in FIG. 1) opposite to the first side as viewed from the vehicle 1. The roadway boundary is, for example, a lane edge line (i.e., an outermost lane marking). As another example, the roadway boundary may be a road end object such as a curb, a guardrail, a wall, and a median strip. A first direction toward the first side is a direction toward the first roadway boundary RB1, and a second direction toward the second side is a direction toward the second roadway boundary RB2.

The crossing target CT is a target that crosses the roadway area RA ahead of the vehicle 1 from the first side toward the second side. In other words, the crossing target CT is a target that crosses the roadway area RA ahead of the vehicle 1 in the second direction. More specifically, the crossing target CT enters the roadway area RA across the first roadway boundary RB1. Furthermore, the crossing target CT moves in the roadway area RA toward the second roadway boundary RB2. Then, the crossing target CT goes out of the roadway area RA across the second roadway boundary RB2.

Next, the driving assist control for avoiding a collision with the crossing target CT will be described with reference to FIGS. 2 and 3. To that end, an "assist area SA" will be first described.

The assist area SA is an area that is set ahead of the vehicle 1, and is used for determining whether or not to activate the driving assist control with respect to a target. More specifically, the driving assist control operates when the target exists within the assist area SA. On the other hand, the driving assist control does not operate when the target exists outside the assist area SA. That is, the driving assist system 10 executes the driving assist control so as to avoid a collision with the target that exists in the assist area SA. A longitudinal width of the assist area SA along a travel direction of the vehicle 1 is set to, for example, a distance corresponding to a predetermined time to collision (TTC). A lateral width of the assist area SA, in particular, a lateral width of the assist area SA with respect to the crossing target CT is as follows.

First, a comparative example will be described with reference to FIG. 2. The assist area SA for the crossing target CT is an area between an assist start boundary SB1 and an assist end boundary SB2. The assist start boundary SB1 is a boundary on the first side of the assist area SA and is located on the first side as viewed from the vehicle 1. On the other hand, the assist end boundary SB2 is a boundary on the second side of the assist area SA and is located on the second side as viewed from the vehicle 1. As described above, the crossing target CT crosses the roadway area RA ahead of the vehicle 1 from the first side toward the second side. When the crossing target CT enters the assist area SA across the assist start boundary SB1, the driving assist control with respect to the crossing target CT is started. After that, when the crossing target CT goes out of the assist area SA across the assist end boundary SB2, the driving assist control with respect to the crossing target CT is ended.

Figure 2:
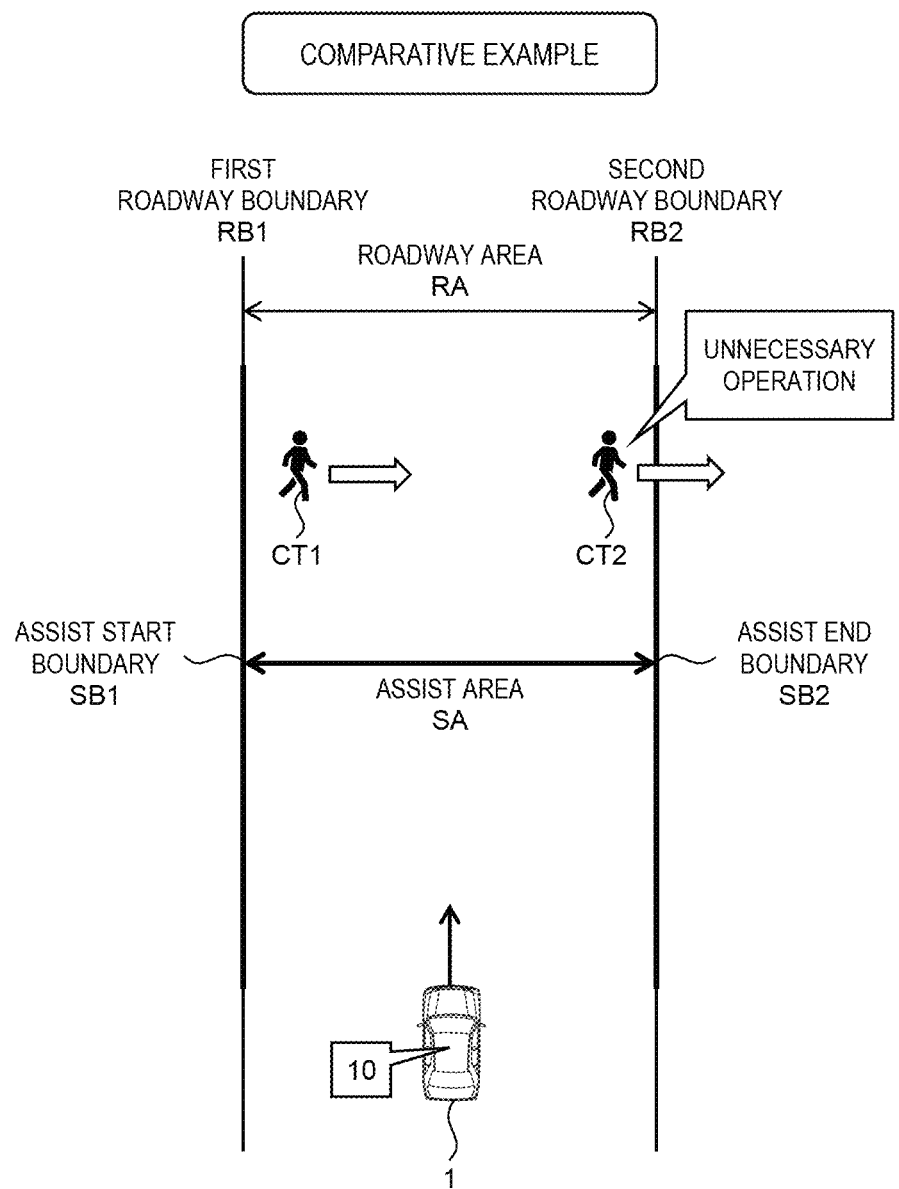
FIG. 2 is a conceptual diagram showing a comparative example.

In the comparative example shown in FIG. 2, the assist start boundary SB1 is the first roadway boundary RB1, and the assist end boundary SB2 is the second roadway boundary RB2. That is, the lateral width of the assist area SA coincides with the lateral width of the roadway area RA. However, in the case of the comparative example, the driving assist control with respect to the crossing target CT may operate more than necessary. In order to explain this, the crossing target CT at the two timings shown in FIG. 2 will be considered.

At a first timing, the crossing target CT is located in the assist area SA on the first side as viewed from the vehicle 1. At a second timing after the first timing, the crossing target CT is located in the assist area SA on the second side as viewed from the vehicle 1. For convenience sake, the crossing target CT at the first timing is referred to as a "first crossing target CT1", and the crossing target CT at the second timing is referred to as a "second crossing target CT2." A direction of movement of the first crossing target CT1 is a direction toward the vehicle 1. Therefore, it is reasonable that the driving assist control operates with respect to the first crossing target CT1. On the other hand, a direction of movement of the second crossing target CT2 is a direction away from the vehicle 1. Therefore, a possibility of collision with the second crossing target CT2 is significantly lower than a possibility of collision with the first crossing target CT1. It is not always necessary to perform the driving assist control with respect to the second crossing target CT2 in the same manner as the first crossing target CT1.

If the driving assist control unnecessarily operates with respect to the second crossing target CT2 where the possibility of collision is significantly reduced, an occupant (typically, a driver) of the vehicle 1 feels a sense of strangeness or a sense of annoyance about the unnecessary operation of the driving assist control. For example, if the deceleration control for avoiding the collision with the crossing target CT remains operating even at the second timing, the occupant of the vehicle 1 feels a sense of strangeness or a sense of annoyance about the unnecessary deceleration control.

Therefore, the present embodiment provides a technique capable of suppressing the unnecessary operation of the driving assist control for avoiding the collision with the crossing target CT.

Figure 3:
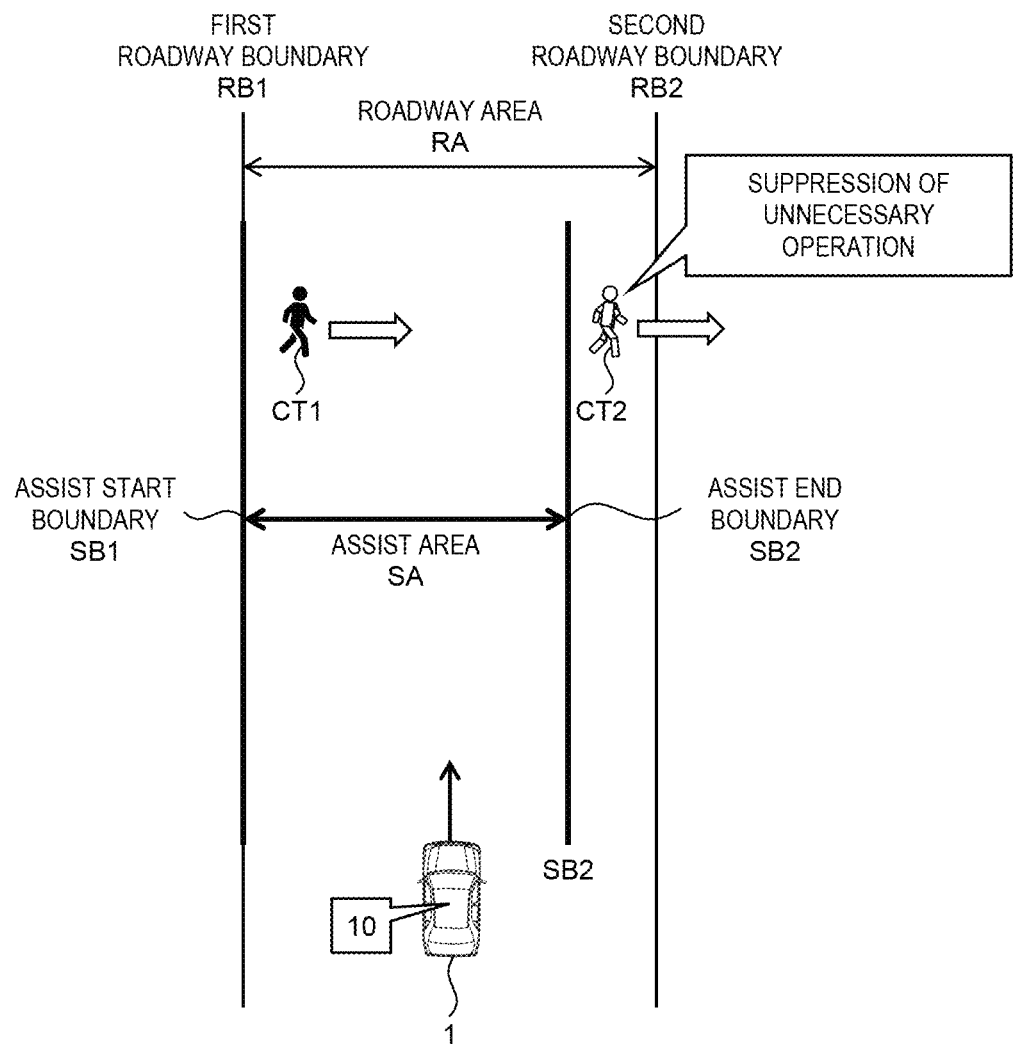
FIG. 3 is a conceptual diagram for explaining driving assist control and an assist area according to the first embodiment of the present disclosure.

FIG. 3 shows a setting of the assist area SA for the crossing target CT according to the present embodiment. According to the present embodiment, the driving assist system 10 sets the assist end boundary SB2 of the assist area SA at a position between the vehicle 1 and the second roadway boundary RB2. In other words, the assist area SA that exists on the second side as viewed from the vehicle 1 is set to be narrower than that in the case of the above-described comparative example (FIG. 2). As a result, a period of time in which the driving assist control operates with respect to the second crossing target CT2 moving in the direction away from the vehicle 1 is shortened. That is, the unnecessary operation of the driving assist control with respect to the second crossing target CT2 having a low possibility of collision is suppressed. Since the unnecessary operation of the driving assist control is suppressed, a sense of strangeness or a sense of annoyance felt by the occupant (typically, the driver) of the vehicle 1 is reduced. This contributes to increase in confidence in the driving assist system 10.

The assist start boundary SB1 of the assist area SA may be the same as in the case of the comparative example (FIG. 2). That is, the assist start boundary SB1 may be set at the position of the first roadway boundary RB1. It is thus possible to certainly activate the driving assist control with respect to the first crossing target CT1 moving toward the vehicle 1. In other words, it is possible to prevent a situation where the driving assist control does not operate with respect to the first crossing target CT1 moving toward the vehicle 1. As a result, a sense of uneasiness felt by the occupant (typically, the driver) of the vehicle 1 is reduced. This also contributes to increase in confidence in the driving assist system 10.

It can be said that the present embodiment applies different setting policies "asymmetrically" to the assist start boundary SB1 and the assist end boundary SB2. The assist start boundary SB1 is set from a viewpoint of certainly activating the driving assist control with respect to the first crossing target CT1 moving toward the vehicle 1. On the other hand, the assist end boundary SB2 is set from a viewpoint of suppressing the unnecessary operation of the driving assist control with respect to the second crossing target CT2 moving away from the vehicle 1. Such the asymmetric setting makes it possible to appropriately execute the driving assist control with respect to the crossing target CT.

Hereinafter, the driving assist system 10 according to the present embodiment will be described in more detail.

1-2. Driving Assist System

1-2-1. Configuration Example

Figure 4:
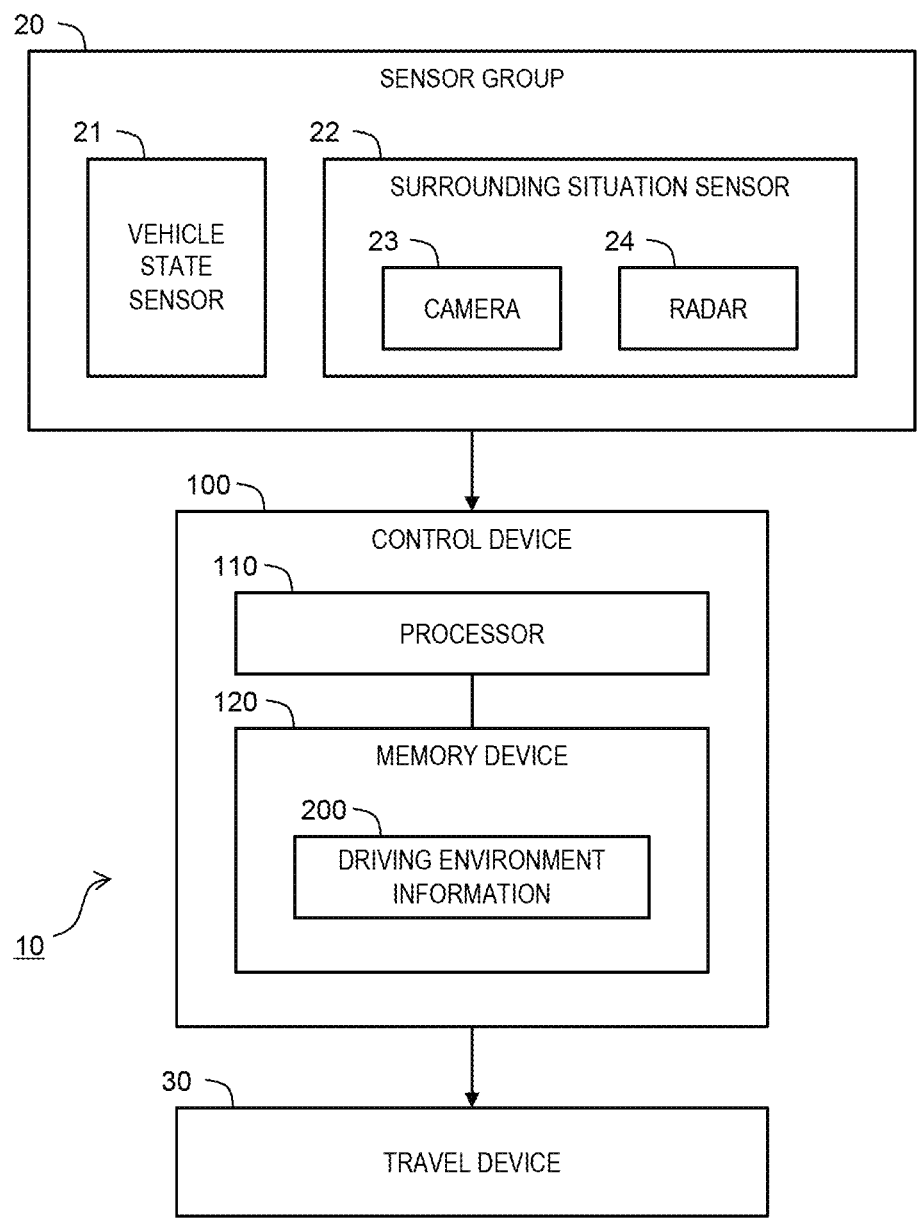
FIG. 4 is a block diagram schematically showing a configuration example of a vehicle and the driving assist system according to the first embodiment of the present disclosure.

FIG. 4 is a block diagram schematically showing a configuration example of the vehicle 1 and the driving assist system 10 according to the present embodiment. In particular, FIG. 4 shows a configuration example related to the driving assist control. The vehicle 1 includes a sensor group 20 and a travel device 30.

The sensor group 20 includes a vehicle state sensor 21. The vehicle state sensor 21 detects a state of the vehicle 1. For example, the vehicle state sensor 21 includes a vehicle speed sensor, a yaw rate sensor, a lateral acceleration sensor, a steering angle sensor, and the like. The vehicle speed sensor detects a vehicle speed of the vehicle 1. The yaw rate sensor detects a yaw rate of the vehicle 1. The lateral acceleration sensor detects a lateral acceleration of the vehicle 1. The steering angle sensor detects a steering angle of a wheel of the vehicle 1.

The sensor group 20 further includes a surrounding situation sensor 22. The surrounding situation sensor 22 detects a situation around the vehicle 1. More specifically, the surrounding situation sensor 22 includes a camera 23 and a radar (millimeter wave radar) 24. The camera 23 is an imaging device that images a situation around the vehicle 1. The radar 24 is a ranging sensor that measures a situation around the vehicle 1. The surrounding situation sensor 22 may further include a LIDAR (Laser Imaging Detection and Ranging).

The travel device 30 includes a steering device, a driving device, and a braking device. The steering device turns (i.e., changes a direction of) the wheel of the vehicle 1. For example, the steering device includes an electric power steering (EPS) device. The driving device is a power source that generates a driving force. Examples of the driving device include an engine, an electric motor, an in-wheel motor, and the like. The braking device generates a braking force.

The driving assist system 10 includes at least a control device (controller) 100. The driving assist system 10 may include the sensor group 20. The driving assist system 10 may include the travel device 30.

The control device 100 controls the vehicle 1. Typically, the control device 100 is a microcomputer installed on the vehicle 1. The control device 100 is also called an electronic control unit (ECU). Alternatively, the control device 100 may be an information processing device outside the vehicle 1. In that case, the control device 100 communicates with the vehicle 1 and remotely controls the vehicle 1.

The control device 100 includes a processor 110 and a memory device 120. The processor 110 executes a variety of processing. The memory device 120 stores a variety of information. Examples of the memory device 120 include a volatile memory, a nonvolatile memory, and the like. The variety of processing by the processor 110 (the control device 100) is achieved by the processor 110 executing a control program being a computer program. The control program is stored in the memory device 120 or recorded in a computer-readable recording medium.

1-2-2. Information Acquisition Process

The processor 110 (the control device 100) executes an "information acquisition process" that acquires driving environment information 200 indicating a driving environment for the vehicle 1. The driving environment information 200 is acquired based on a result of detection by the sensor group 20 installed on the vehicle 1. The acquired driving environment information 200 is stored in the memory device 120.

Figure 5:
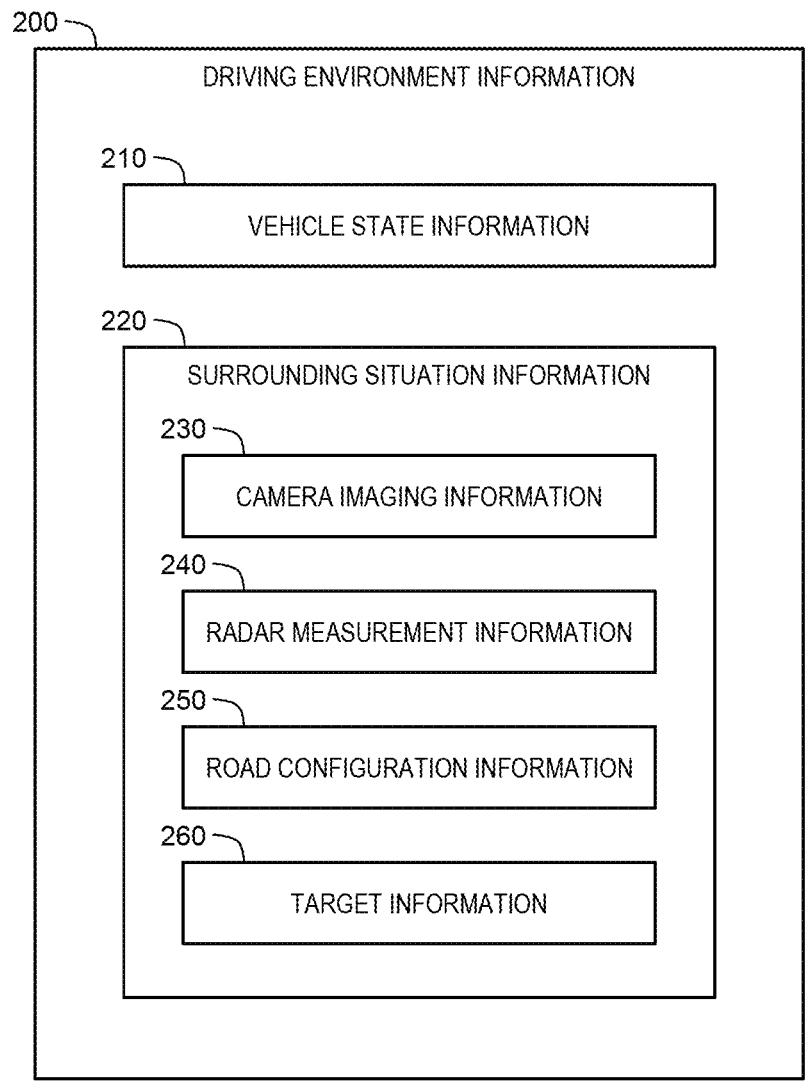
FIG. 5 is a block diagram showing an example of driving environment information in the first embodiment of the present disclosure.

FIG. 5 is a block diagram showing an example of the driving environment information 200. The driving environment information 200 includes vehicle state information 210 and surrounding situation information 220.

The vehicle state information 210 is information indicating the state of the vehicle 1. Examples of the state of the vehicle 1 include the vehicle speed, the yaw rate, the lateral acceleration, the steering angle, and the like. The processor 110 acquires the vehicle state information 210 from a result of detection by the vehicle state sensor 21.

The surrounding situation information 220 is information indicating the situation around the vehicle 1. The processor 110 acquires the surrounding situation information 220 based on a result of detection by the surrounding situation sensor 22. For example, the surrounding situation information 220 includes camera imaging information 230, radar measurement information 240, road configuration information 250, and target information 260.

The camera imaging information 230 is information indicating a result of imaging by the camera 23. The camera imaging information 230 includes image information indicating the situation around the vehicle 1 imaged by the camera 23.

The radar measurement information 240 is information indicating a result of measurement by the radar 24. The radar measurement information 240 includes information (for example, a relative position and a relative speed) of an object around the vehicle 1.

The road configuration information 250 is information on a road configuration around the vehicle 1. The road configuration around the vehicle 1 includes lane markings (white lines) and road end objects. The road end object is a three dimensional obstacle representing an end of a road. Examples of the road end object include a curb, a guardrail, a wall, a median strip, planting, and the like. The road configuration information 250 indicates at least a position (a relative position with respect to the vehicle 1) of each of the lane marking and the road end object.

For example, analyzing the camera imaging information 230 (the image information) makes it possible to identify the lane marking and calculate the relative position of the lane marking. Examples of the image analysis method include semantic segmentation and edge detection. Similarly, analyzing the camera imaging information 230 (the image information) makes it possible to identify the road end object and calculate the relative position of the road end object. Alternatively, since a reflection intensity of the radar wave from the three dimensional road end object is high, the relative position of the road end object may be acquired from the radar measurement information 240.

The target information 260 is information on a target around the vehicle 1. Examples of the target include a pedestrian, a bicycle, a motorcycle, another vehicle (a preceding vehicle, a parked vehicles, and the like), an animal, a fallen object, and the like. The target information 260 indicates a relative position and a relative speed of the target with respect to the vehicle 1. For example, analyzing the camera imaging information 230 (the image information) makes it possible to identify the target and calculate the relative position of the target. It is also possible to identify the target and acquire the relative position and the relative speed of the target based on the radar measurement information 240. The target information 260 may include a direction of movement and a moving speed of the target. The direction of movement and the moving speed of the target can be calculated by tracking the position of the target.

1-2-3. Vehicle Travel Control

The processor 110 (the control device 100) executes "vehicle travel control" that controls travel of the vehicle 1. The vehicle travel control includes steering control that controls steering of the vehicle 1, acceleration control that controls acceleration of the vehicle 1, and deceleration control that controls deceleration of the vehicle 1. The processor 110 executes the vehicle travel control by controlling the travel device 30. More specifically, the processor 110 executes the steering control by controlling the steering device. The processor 110 executes the acceleration control by controlling the driving device. The control device 100 executes the deceleration control by controlling the braking device.

1-2-4. Outline of Driving Assist Control

The processor 110 (the control device 100) executes the "driving assist control" that assists driving of the vehicle 1. In particular, the processor 110 executes the driving assist control (collision avoidance control, risk avoidance control) for avoiding a collision with a target ahead of the vehicle 1. The driving assist control for avoiding a collision with a target ahead of the vehicle 1 includes at least one of the deceleration control and the steering control. The processor 110 executes the driving assist control based on the above-described driving environment information 200.

Figure 6:
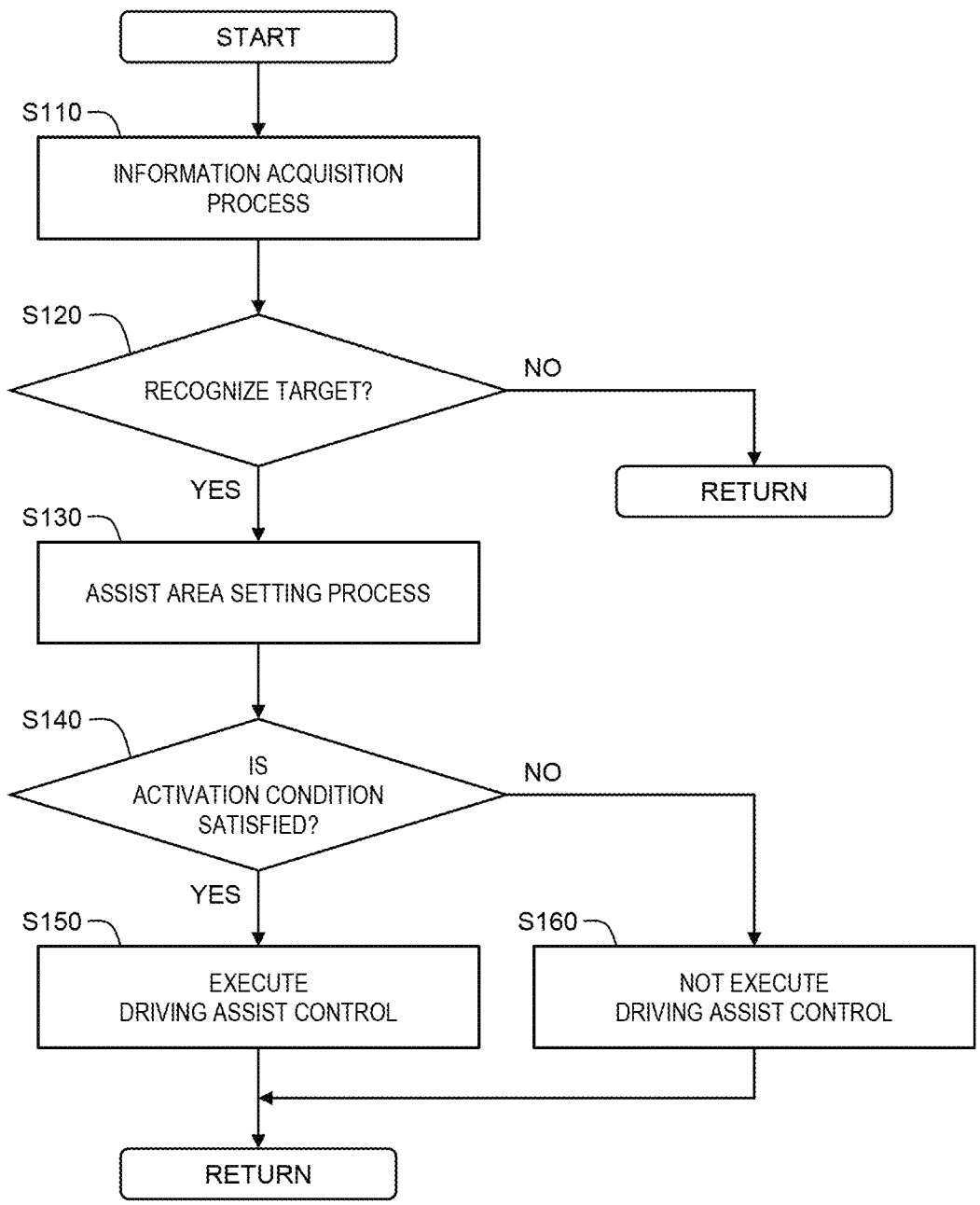
FIG. 6 is a flow chart showing processing related to the driving assist control by the driving assist system according to the first embodiment of the present disclosure.

FIG. 6 is a flow chart showing processing related to the driving assist control according to the present embodiment. The process flow shown in FIG. 6 is repeatedly executed at a predetermined cycle.

In Step S110, the processor 110 executes the information acquisition process described above. That is, the processor 110 acquires the driving environment information 200 based on the result of detection by the sensor group 20. The driving environment information 200 is stored in the memory device 120.

In Step S120, the processor 110 determines whether or not a target exists ahead of the vehicle 1 based on the target information 260. In other words, the processor 110 determines whether or not a target is recognized in an area ahead of the vehicle 1.

In particular, the crossing target CT is a target that crosses the roadway area RA ahead of the vehicle 1 from the first side toward the second side. The processor 110 recognizes a target crossing the roadway area RA ahead of the vehicle 1 from the first side toward the second side, as the crossing target CT. The boundary (RB1, RB2) of the roadway area RA is a lane edge line or a road end object. The positions of the lane edge line and the road end object are obtained from the road configuration information 250. The position and the direction of movement of the target are obtained from the target information 260. Therefore, the processor 110 can recognize the crossing target CT based on the road configuration information 250 and the target information 260.

When a target exists ahead of the vehicle 1 (Step S120; Yes), the processing proceeds to Step S130. On the other hand, when no target exists ahead of the vehicle 1 (Step 120; No), the processing in the current cycle ends.

In Step S130, the processor 110 executes an "assist area setting process" that sets the assist area SA for the target. The assist area SA is an area that is set ahead of the vehicle 1, and is used for determining whether or not to activate the driving assist control with respect to the target. Details of the assist area setting process will be described later.

In subsequent Step S140, the processor 110 determines whether or not an activation condition of the driving assist control is satisfied. The activation condition of the driving assist control is that the target exists within the assist area SA. The position of the target is obtained from the target information 260. When the activation condition is satisfied (Step S140; Yes), the processing proceeds to Step S150. On the other hand, when the activation condition is not satisfied (Step S140; No), the processing proceeds to Step S160.

In Step S150, the processor 110 executes the driving assist control, that is, activates the driving assist control. More specifically, the processor 110 executes at least one of the deceleration control and the steering control based on the driving environment information 200 in order to avoid a collision between the vehicle 1 and the target. For example, the processor 110 calculates at least one of a target deceleration and a target steering angle necessary for avoiding a collision with the target, based on the vehicle state information 210 and the target information 260. The processor 110 controls the braking device in accordance with the target deceleration. The processor 110 controls the steering device in accordance with the target steering angle.

In Step S160, the processor 110 does not execute the driving assist control. That is, the processor 110 does not activate the driving assist control. When the driving assist control is already in execution, the processor 110 terminates the driving assist control.

1-3. Assist Area Setting Process (Step S130)

Hereinafter, the assist area setting process (Step S130) with respect to the crossing target CT will be described in detail. Various examples of the assist area setting process are conceivable.

1-3-1. First Example

Figure 7:
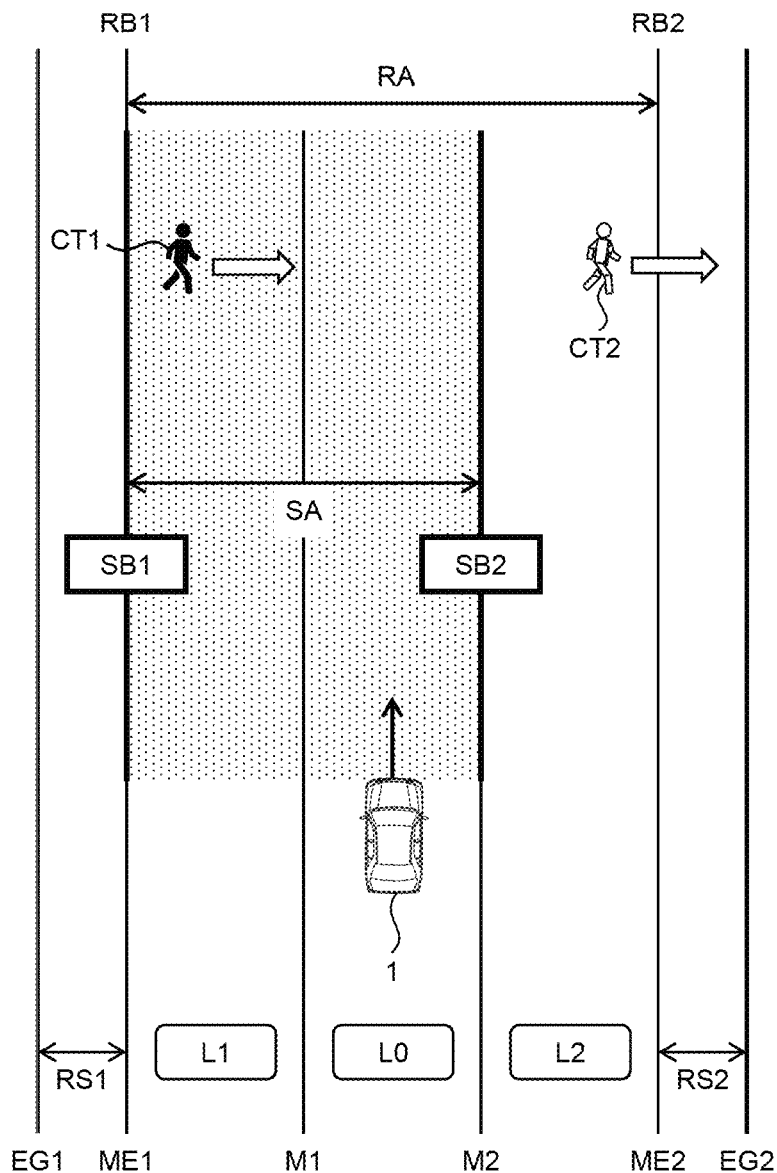
FIG. 7 is a conceptual diagram for explaining a first example of assist area setting process according to the first embodiment of the present disclosure.

FIG. 7 is a conceptual diagram for explaining a first example of the assist area setting process with respect to the crossing target CT. In the first example, a case where lane markings exist on a road will be described.

A three-lane road is shown in FIG. 7. The vehicle 1 exist in a center lane L0. A first lane L1 exists on the first side of the lane L0. A second lane L2 exists on the second side of the lane L0.

A first nearby lane marking M1, a first lane edge line ME1, and a first road end object EG1 exist on the first side as viewed from the vehicle 1. The first nearby lane marking M1 is a lane marking on the first side of the lane L0 and represents a boundary between the lane L0 and the first lane L1. It can be said that the first nearby lane marking M1 is a lane marking closest to the vehicle 1 among the lane markings existing on the first side as viewed from the vehicle 1. The first lane edge line ME1 is a lane marking on the first side of the first lane L1 and represents a boundary between the first lane L1 and a first road shoulder RS1. The first road shoulder RS1 is an area between the first lane edge line ME1 and the first road end object EG1.

A second nearby lane marking M2, a second lane edge line ME2, and a second road end object EG2 exist on the second side as viewed from the vehicle 1. The second nearby lane marking M2 is a lane marking on the second side of the lane L0 and represents a boundary between the lane L0 and the second lane L2. It can be said that the second nearby lane marking M2 is a lane marking closest to the vehicle 1 among the lane markings existing on the second side as viewed from the vehicle 1. The second lane edge line ME2 is a lane marking on the second side of the second lane L2 and represents a boundary between the second lane L2 and a second road shoulder RS2. The second road shoulder RS2 is an area between the second lane edge line ME2 and the second road end object EG2.

The boundary (RB1, RB2) of the roadway area RA is the lane edge line or the road end object. For example, the roadway area RA is an area between the first lane edge line ME1 and the second lane edge line ME2. In this case, the first roadway boundary RB1 is the first lane edge line ME1, and the second roadway boundary RB2 is the second lane edge line ME2. As another example, the roadway area RA may be an area between the first road end object EG1 and the second road end object EG2. In this case, the first roadway boundary RB1 is the first road end object EG1, and the second roadway boundary RB2 is the second road end object EG2.

The setting of the assist area SA is as follows. The processor 110 sets the assist start boundary SB1 of the assist area SA at the position of the first roadway boundary RB1. On the other hand, the processor 110 sets the assist end boundary SB2 of the assist area SA independently of the second roadway boundary RB2. More specifically, the processor 110 sets the assist end boundary SB2 at the position of the second nearby lane marking M2 instead of the second roadway boundary RB2. The second nearby lane marking M2 is located between the vehicle 1 and the second roadway boundary RB2. Therefore, the assist end boundary SB2 is set at a position between the vehicle 1 and the second roadway boundary RB2.

The positions of the first roadway boundary RB1 and the second nearby lane marking M2 are obtained from the road configuration information 250. Therefore, the processor 110 is able to set the assist start boundary SB1 and the assist end boundary SB2 to set the assist area SA based on the road configuration information 250.

1-3-2. Second Example

Figure 8:
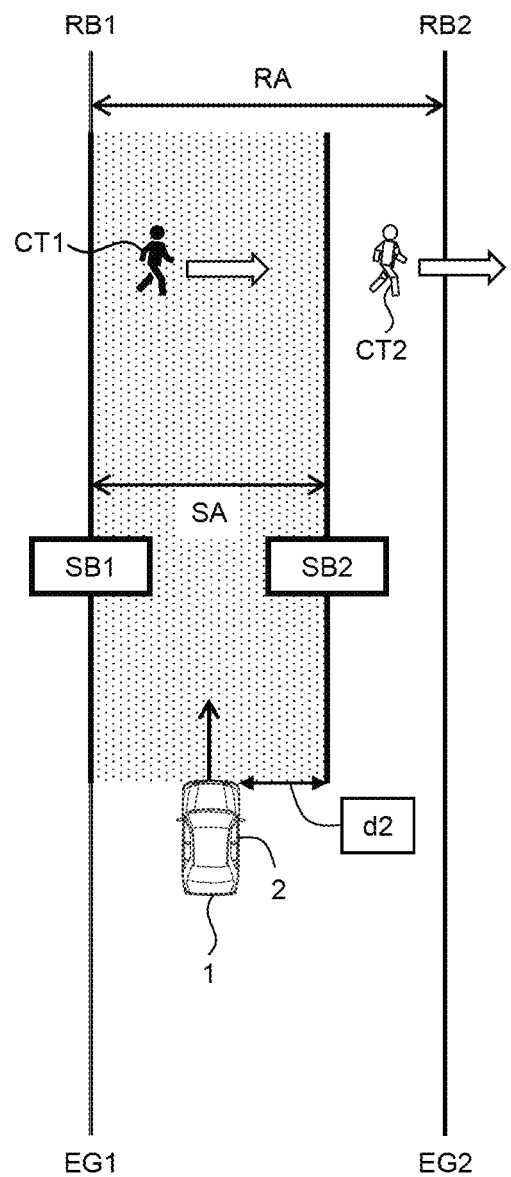
FIG. 8 is a conceptual diagram for explaining a second example of the assist area setting process according to the first embodiment of the present disclosure.

FIG. 8 is a conceptual diagram for explaining a second example of the assist area setting process with respect to the crossing target CT. In the second example, a case where no lane marking exists on the road will be described. The description overlapping with the first example will be appropriately omitted.

In FIG. 8, the roadway area RA is an area between the first road end object EG1 and the second road end object EG2. That is, the first roadway boundary RB1 is the first road end object EG1, and the second roadway boundary RB2 is the second road end object EG2.

The processor 110 sets the assist start boundary SB1 of the assist area SA at the position of the first roadway boundary RB1. On the other hand, the processor 110 sets the assist end boundary SB2 of the assist area SA based on a vehicle end 2 that is an end portion (side portion) of the vehicle 1 on the second side. More specifically, the processor 110 sets the assist end boundary SB2 at a position apart from the vehicle end 2 toward the second side by a second distance d2.

For example, the second distance d2 is an allowable minimum value of a lateral distance between the vehicle end 2 and the second crossing target CT2. In general, the vehicle 1 travel at a certain distance from the first road end object EG1 and the second road end object EG2. The position apart from the vehicle end 2 by the second distance d2 is generally located between the vehicle 1 and the second road end object EG2 (i.e., the second roadway boundary RB2).

Alternatively, the second distance d2 may be set such that the assist end boundary SB2 is located between the vehicle 1 and the second road end object EG2 (i.e., the second roadway boundary RB2). The position of the second road end object EG2 is obtained from the road configuration information 250. Therefore, the processor 110 is able to set the second distance d2 and the assist end boundary SB2 based on the road configuration information 250.

1-3-3. Process Flow

Figure 9:
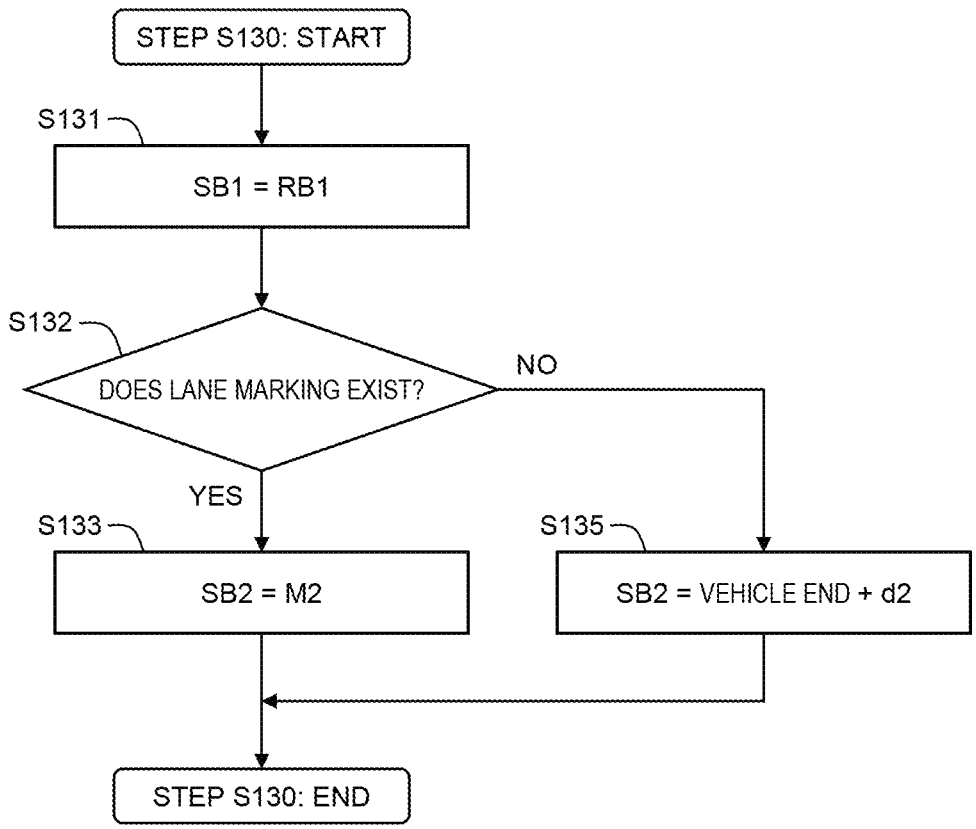
FIG. 9 is a flow chart showing the assist area setting process according to the first embodiment of the present disclosure.

FIG. 9 is a flow chart showing the assist area setting process (Step S130) according to the present embodiment.

In Step S131, the processor 110 sets the assist start boundary SB1 of the assist area SA at the position of the first roadway boundary RB1.

In Step S132, the processor 110 determines, based on the road configuration information 250, whether or not there is a lane marking on the road around the vehicle 1. When the lane marking exists (Step S132; Yes), the processing proceeds to Step S133. On the other hand, when there is no lane marking (Step S132; No), the processing proceeds to Step S135.

In Step S133, the processor 110 sets the assist end boundary SB2 of the assist area SA at the position of the second nearby lane marking M2 (see FIG. 7).

In Step S135, the processor 110 sets the assist end boundary SB2 of the assist area SA at a position apart from the vehicle end 2 toward the second side by the second distance d2 (see FIG. 8).

1-3-4. Supplementary Explanation

Figure 10:
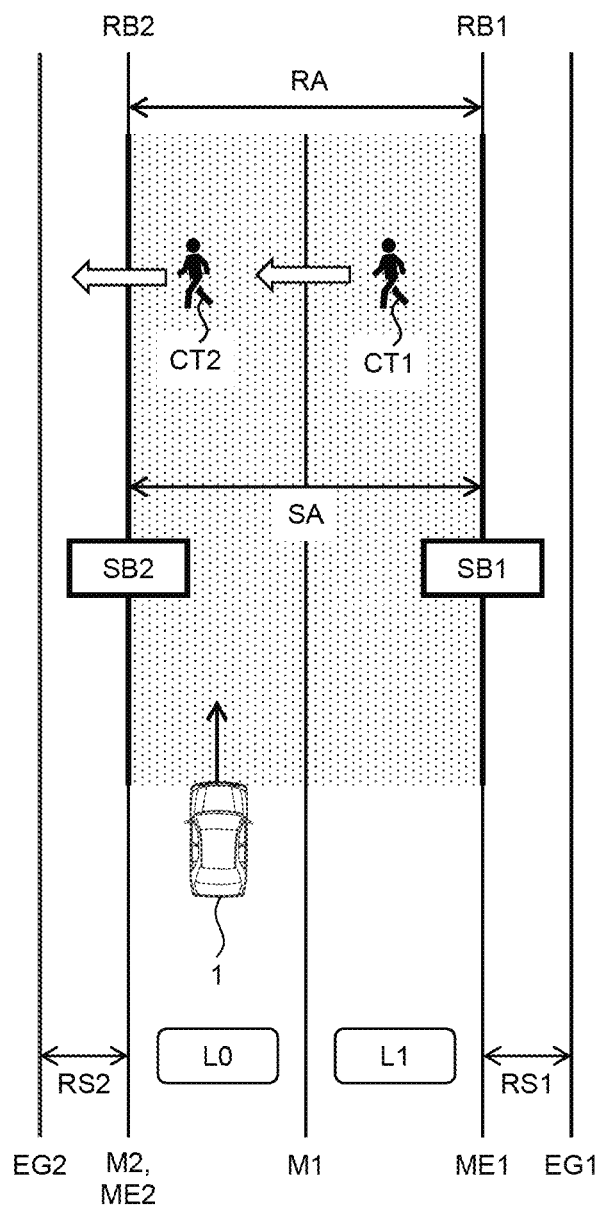
FIG. 10 is a conceptual diagram for explaining another example of the assist area setting process according to the first embodiment of the present disclosure.

FIG. 10 shows a situation in which the unnecessary operation of the driving assist control does not occur. It should be noted here that the first side and the second side are reversed as compared with FIGS. 7 and 8. In the example shown in FIG. 10, the lane L0 is located on the outermost side, and the second nearby lane marking M2 is the second lane edge line ME2. The second crossing target CT2 exists in the same lane L0 as the vehicle 1. It is reasonable and not unnecessary that the driving assist control operates with respect to the second crossing target CT2 existing in the same lane L0. According to the above-described flow shown in FIG. 9, the assist end boundary SB2 is set at the position of the second nearby lane marking M2, that is, the second roadway boundary RB2. Although the assist end boundary SB2 is not located between the vehicle 1 and the second roadway boundary RB2, the flow shown in FIG. 9 does not cause a problem in practical use because the unnecessary operation of the driving assist control does not occur.

2. Second Embodiment

In a second embodiment, a modification example of the first example shown in the foregoing FIG. 7 will be described.

As described above, analyzing the camera imaging information 230 (image information) makes it possible to identify a lane marking and calculate a position of the identified lane marking. However, an accuracy of the position calculation of the lane marking is not necessarily high. For example, blurring of the lane marking (white line) degrades the accuracy of the position calculation. An oscillation of the camera 23 caused by an oscillation of the vehicle 1 (pitching in particular) also degrades the accuracy of the position calculation.

An error of the calculated position of the lane marking affects an accuracy of the setting of the assist area SA. For example, the assist area SA may become narrower than expected due to the error of the calculated position of the lane marking. In this case, the driving assist control may not operate with respect to a target requiring the driving assist control. In view of the above, in the second embodiment, the error of calculated position of the lane marking is taken into consideration.

Figure 11:
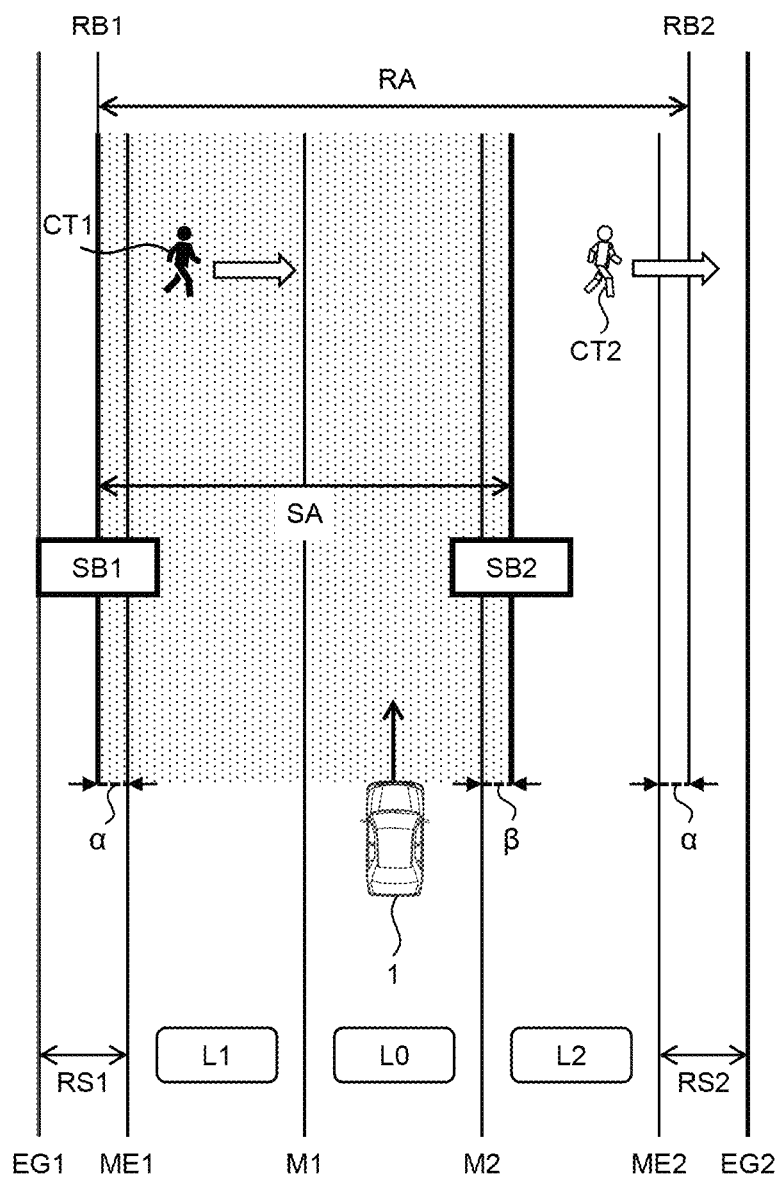
FIG. 11 is a conceptual diagram for explaining an example of the assist area setting process according to a second embodiment of the present disclosure.

FIG. 11 is a conceptual diagram for explaining an example of the assist area setting process according to the second embodiment. Description overlapping with the first example shown in FIG. 7 will be appropriately omitted.

The first roadway boundary RB1 of the roadway area RA is set at a position apart from the first lane edge line ME1 toward the first side by a distance a. Similarly, the second roadway boundary RB2 of the roadway area RA is set at a position apart from the second lane edge line ME2 toward the second side by the distance a. The distance a is a predetermined value that is set in consideration of the error of the calculated position of the lane edge line.

The setting of the assist area SA is as follows. The processor 110 sets the assist start boundary SB1 of the assist area SA at the position of the first roadway boundary RB1. Moreover, the processor 110 sets the assist end boundary SB2 of the assist area SA at a position apart from the second nearby lane marking M2 toward the second side by a first distance j. The first distance j is a predetermined value that is set in consideration of an error of the calculated position of the second nearby lane marking M2. The first distance j may be the same as the distance a or may be different from the distance a. In either case, the first distance j is significantly smaller than a general lane width.

Figure 12:
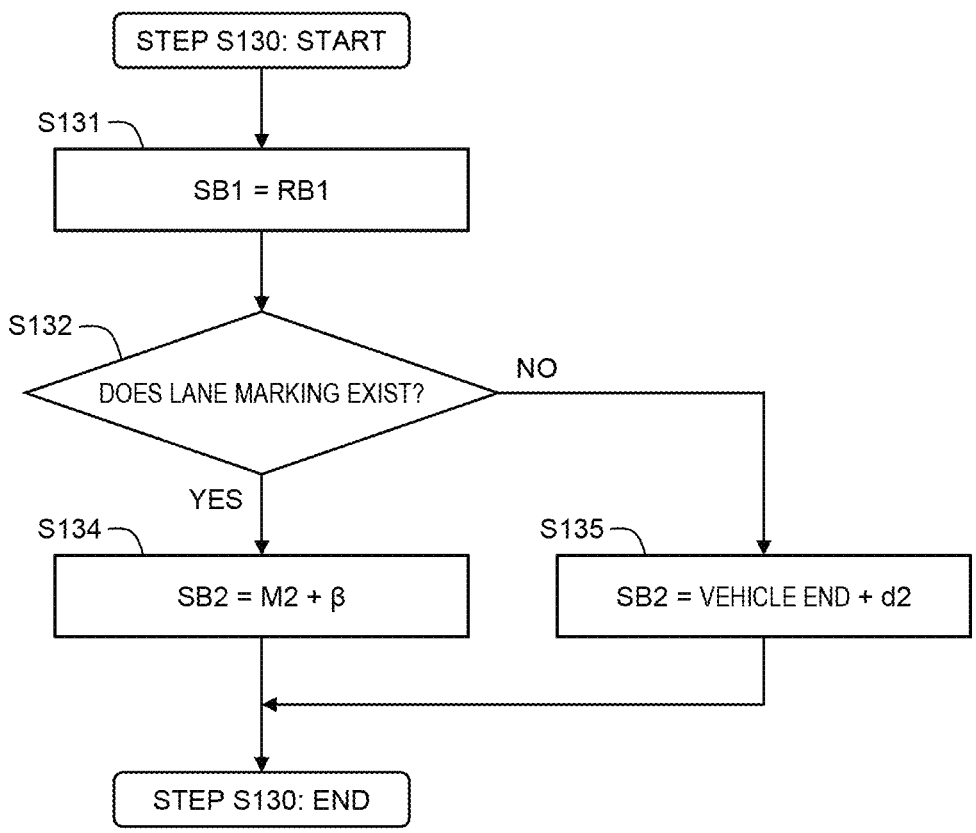
FIG. 12 is a flow chart showing the assist area setting process according to the second embodiment of the present disclosure.

FIG. 12 is a flow chart showing the assist area setting process (Step S130) according to the second embodiment. As compared with the flow shown in FIG. 9, Step S133 is replaced with Step S134. In Step S134, the processor 110 sets the assist end boundary SB2 of the assist area SA at a position apart from the second nearby lane marking M2 toward the second side by the first distance (3.

According to the second embodiment, the same effects as in the case of the first embodiment can be obtained. Furthermore, since the error of the calculated position of the lane marking is taken into consideration, it is possible to prevent the assist area SA from becoming narrower than expected. As a result, non-operation of the necessary driving assist control is suppressed.

3. Third Embodiment

In a third embodiment, a modification example of the second example shown in the foregoing FIG. 8 will be described.

Figure 13:
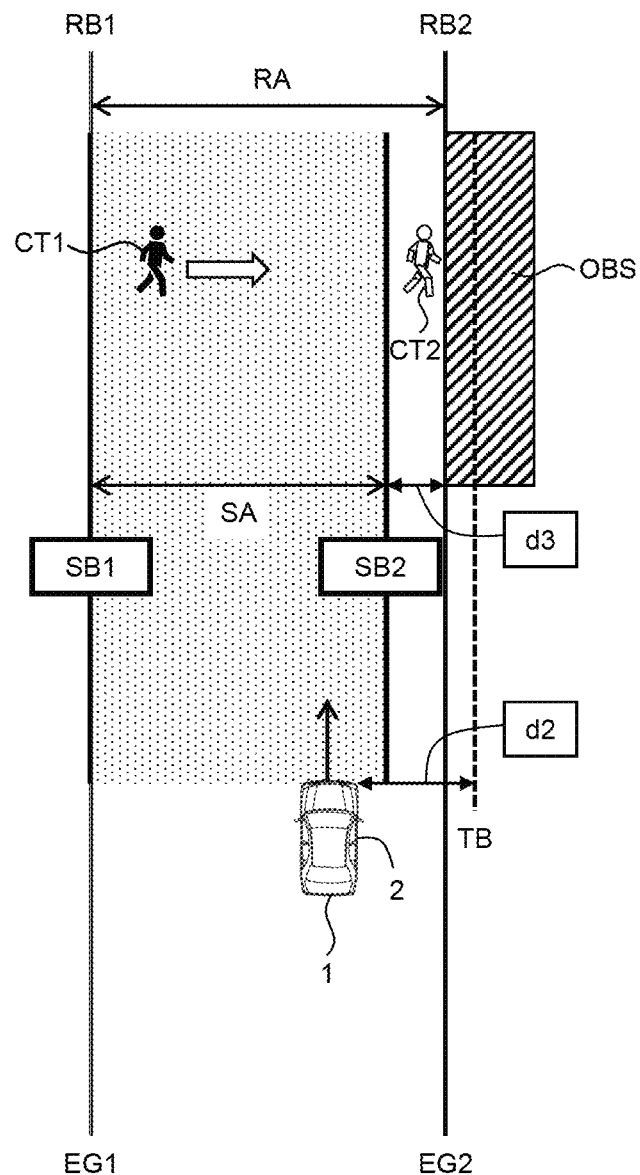
FIG. 13 is a conceptual diagram for explaining an example of the assist area setting process according to a third embodiment of the present disclosure.

FIG. 13 is a conceptual diagram for explaining an example of the assist area setting process according to the third embodiment. In the example shown in FIG. 13, an obstacle OBS that obstructs movement of the crossing target CT exists in a direction of movement of the crossing target CT. More specifically, the obstacle OBS is a wall object (three-dimensional continuous structure) such as a fence, a wall, a building, a guardrail, and the like. Typically, the obstacle OBS coincides with the second road end object EG2. The crossing target CT cannot physically cross such the obstacle OBS.

According to the second example shown in the foregoing FIG. 8, the assist end boundary SB2 of the assist area SA is set at the position apart from the vehicle end 2 toward the second side by the second distance d2. When the obstacle OBS exists between the assist end boundary SB2 and the vehicle end 2, the crossing target CT cannot physically reach the assist end boundary SB2. In this case, even after the crossing target CT reaches the obstacle OBS, the driving assist control is not terminated but continue. In other words, the driving assist control continues even after the crossing target CT finishes the crossing. This may bring a sense of strangeness to the occupant of the vehicle 1.

In view of the above, according to the third embodiment, the position apart from the vehicle end 2 toward the second side by the second distance d2 is first calculated as a "provisional boundary position TB." When the obstacle OBS exists between the provisional boundary position TB and the vehicle end 2, the assist end boundary SB2 of the assist area SA is set at a position between the vehicle end 2 and the obstacle OBS. For example, the assist end boundary SB2 is set at a position apart from the obstacle OBS toward the first side by a third distance d3. The third distance d3 is smaller than the second distance d2 (d3<d2). The third distance d3 is appropriately determined from a general width of the crossing target CT, driving of a normative driver, and the like.

Figure 14:
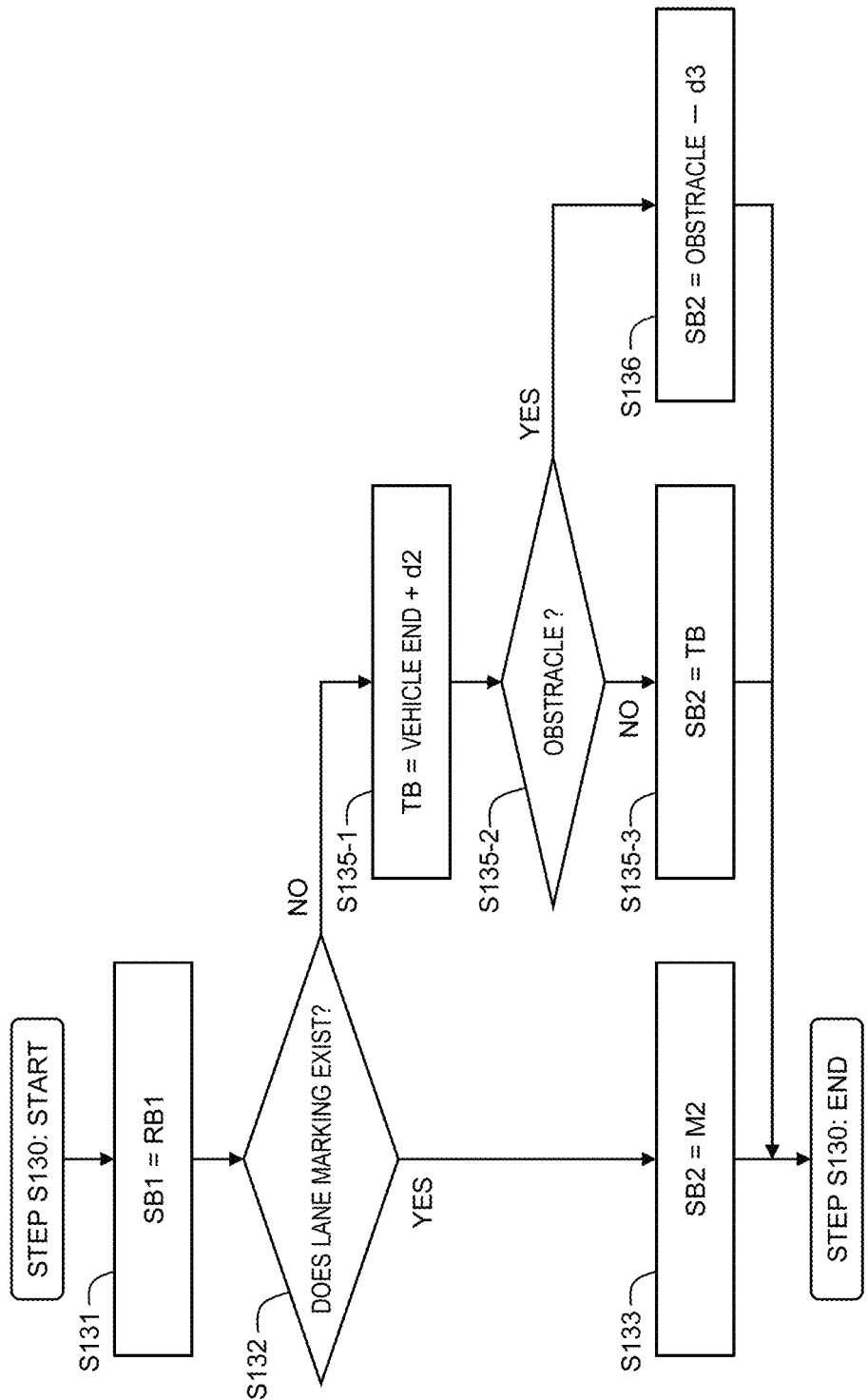
FIG. 14 is a flow chart showing the assist area setting process according to the third embodiment of the present disclosure.

FIG. 14 is a flow chart showing the assist area setting process (Step S130) according to the third embodiment. Description overlapping with FIG. 9 will be appropriately omitted. When there is no lane marking (Step S132; No), the processing proceeds to Step S135-1.

In Step S135-1, the processor 110 calculates a position apart from the vehicle end 2 toward the second side by the second distance d2, as a provisional boundary position TB.

In Step S135-2, the processor 110 determines whether or not the obstacle OBS exists between the provisional boundary position TB and the vehicle end 2. The obstacle OBS is recognized based on the camera imaging information 230 or the radar measurement information 240. The position of the obstacle OBS is obtained from the road configuration information 250.

When no obstacle OBS exists between the provisional boundary position TB and the vehicle end 2 (Step S135-2; No), the processing proceeds to Step S135-3. In Step S135-3, the processor 110 sets the assist end boundary SB2 of the assist area SA at the provisional boundary position TB. Step S135-3 is substantially the same as Step S135 shown in FIG. 9.

On the other hand, when the obstacle OBS exists between the provisional boundary position TB and the vehicle end 2 (Step S135-2; Yes), the processing proceeds to Step S136. In Step S136, the processor 110 sets the assist end boundary SB2 of the assist area SA at a position between the vehicle end 2 and the obstacle OBS. For example, the processor 110 sets the assist end boundary SB2 at a position apart from the obstacle OBS toward the first side by the third distance d3.

According to the third embodiment, the same effects as in the case of the first embodiment can be obtained. Furthermore, it is possible to suppress continuation of the driving assist control after the crossing target CT reaches the obstacle OBS.

4. Fourth Embodiment

Figure 15:
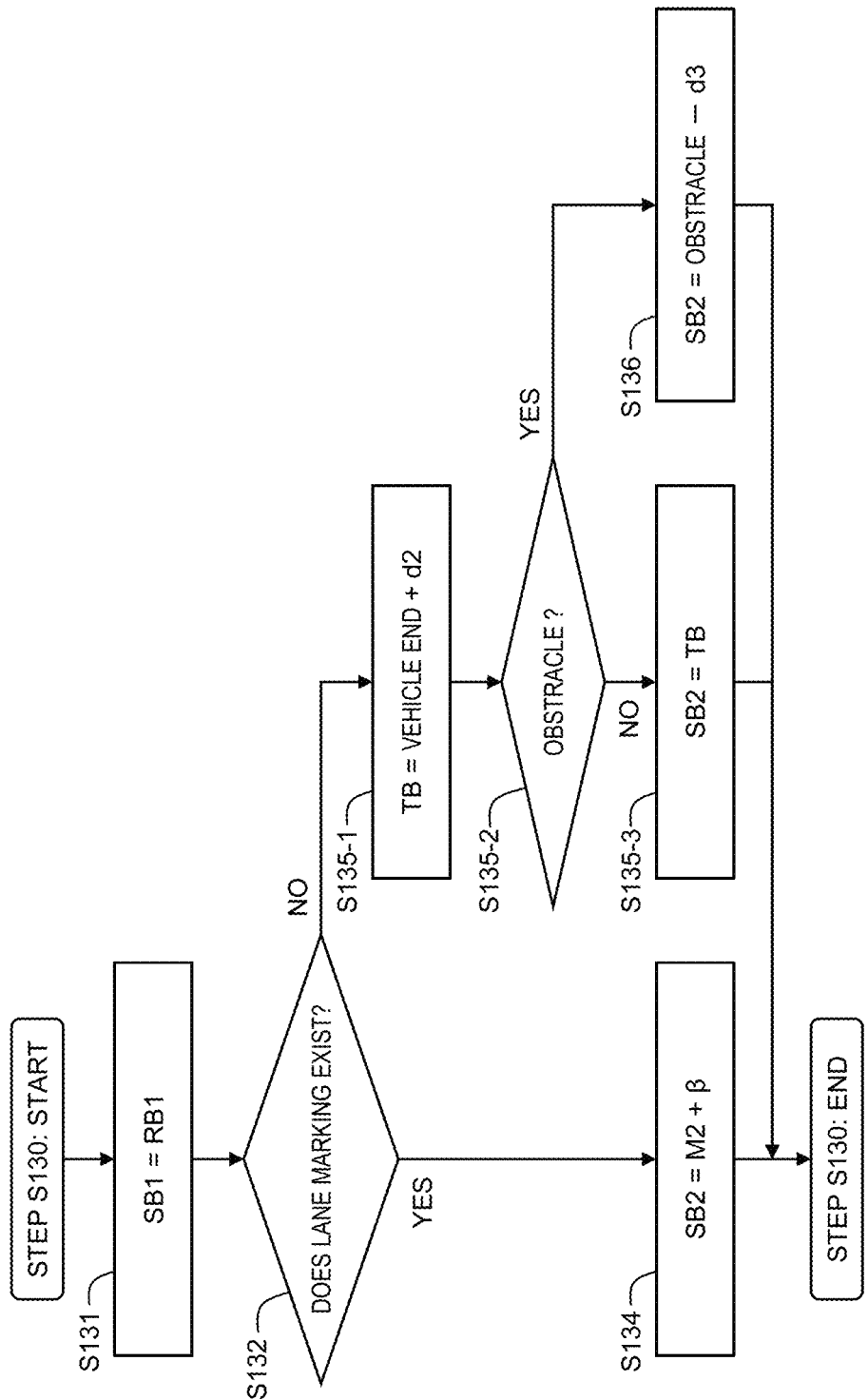
FIG. 15 is a flow chart showing the assist area setting process according to a fourth embodiment of the present disclosure.

FIG. 15 is a flow chart showing the assist area setting process (Step S130) according to a fourth embodiment. The fourth embodiment is a combination of the second embodiment and the third embodiment. As compared with the flow shown in FIG. 14, Step S133 is replaced with Step S134. In Step S134, the processor 110 sets the assist end boundary SB2 of the assist area SA at a position apart from the second nearby lane marking M2 toward the second side by the first distance (3.

According to the fourth embodiment, the same effects as in the cases of the second embodiment and the third embodiments can be obtained.

5. Fifth Embodiment

Figure 16:
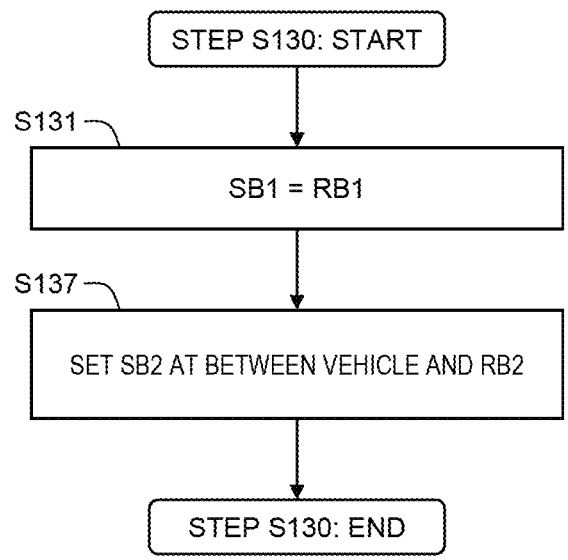
FIG. 16 is a flow chart showing the assist area setting process according to a fifth embodiment of the present disclosure.

FIG. 16 is a flow chart showing the assist area setting process (Step S130) according to a fifth embodiment. Descriptions overlapping with those of the foregoing embodiments will be appropriately omitted. Step S131 is the same as in the case of the foregoing embodiments.

In Step S137, the processor 110 recognizes the position of the second roadway boundary RB2. The second roadway boundary RB2 is the second lane edge line ME2 or the second road end object EG2. Therefore, the processor 110 is able to acquire the position of the second roadway boundary RB2 from the road configuration information 250. Then, the processor 110 sets the assist end boundary SB2 at a position between the vehicle 1 and the second roadway boundary RB2. For example, the processor 110 sets the assist end boundary SB2 at a middle position between the vehicle 1 and the second roadway boundary RB2.

According to the fifth embodiment, the same effects as in the case of the first embodiment can be obtained.

6. Sixth Embodiment

6-1. Outline

Figure 17:
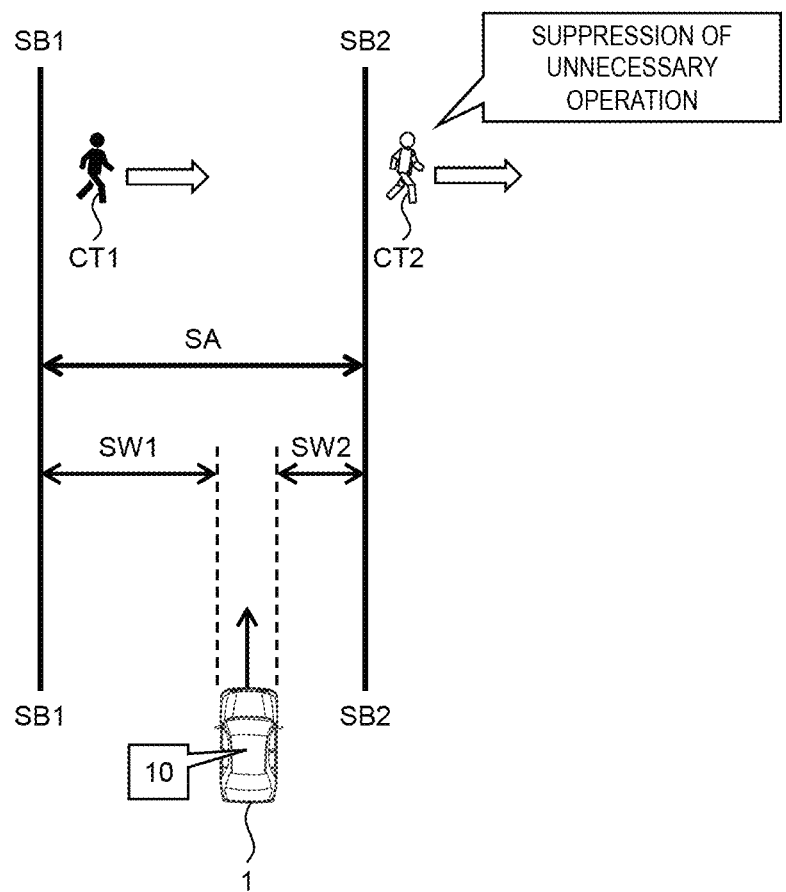
FIG. 17 is a conceptual diagram for explaining an outline of the assist area setting process according to a sixth embodiment of the present disclosure.

FIG. 17 is a conceptual diagram for explaining an outline of the assist area setting process according to a sixth embodiment. Descriptions overlapping with those of the foregoing embodiments will be appropriately omitted.

A first assist width SW1 is a distance (i.e., a lateral width) between the vehicle 1 and the assist start boundary SB1 of the assist area SA. A second assist width SW2 is a distance (i.e., a lateral width) between the vehicle 1 and the assist end boundary SB2 of the assist area SA. According to the sixth embodiment, the processor 110 sets the assist area SA for the crossing target CT such that the second assist width SW2 is smaller than the first assist width SW1. In other words, the processor 110 asymmetrically sets the first assist width SW1 and the second assist width SW2. A ratio between the first assist width SW1 and the second assist width SW2 may be a fixed value or may dynamically change. At least one of the first assist width SW1 and the second assist width SW2 may be a fixed value or may dynamically change.

Since the second assist width SW2 is smaller than the first assist width SW1, the assist area SA on the second side as viewed from the vehicle 1 is narrower than the assist area SA on the first side as viewed from the vehicle 1. As a result, a period of time in which the driving assist control operates with respect to the second crossing target CT2 becomes shorter than a period of time in which the driving assist control operates with respect to the first crossing target CT1. That is, an unnecessary operation of the driving assist control with respect to the second crossing target CT2 having a low possibility of collision is suppressed. Since the unnecessary operation of the driving assist control is suppressed, a sense of strangeness or a sense of annoyance felt by the occupant (typically, the driver) of the vehicle 1 is reduced. This contributes to increase in confidence in the driving assist system 10.

Moreover, since the first assist width SW1 is relatively large, it is possible to certainly activate the driving assist control with respect to the first crossing target CT1 moving toward the vehicle 1. In other words, it is possible to prevent a situation where the driving assist control does not operate with respect to the first crossing target CT1 moving toward the vehicle 1. As a result, a sense of uneasiness felt by the occupant (typically, the driver) of the vehicle 1 is reduced. This also contributes to increase in confidence in the driving assist system 10.

6-2. Example of Assist Area Setting Process

Figure 18:
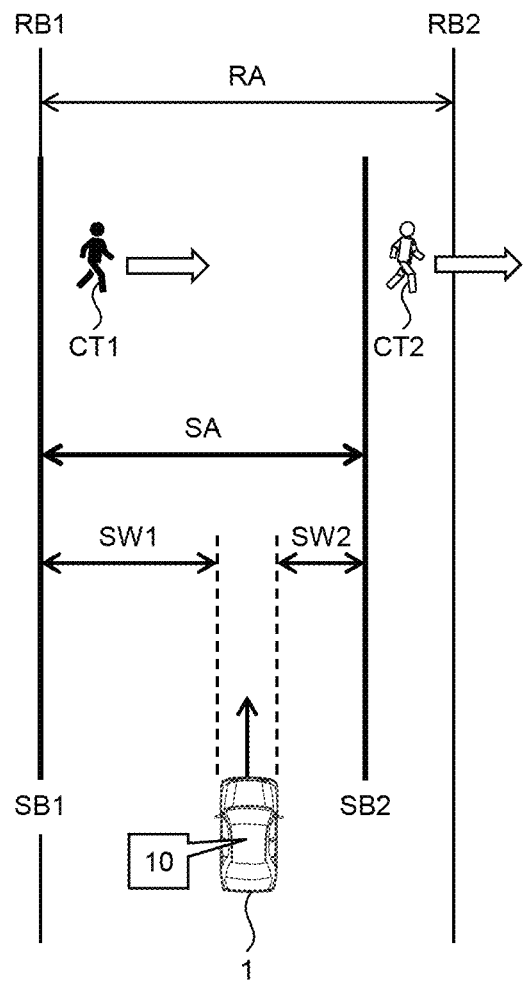
FIG. 18 is a conceptual diagram for explaining an example of the assist area setting process according to the sixth embodiment of the present disclosure.
Figure 19:
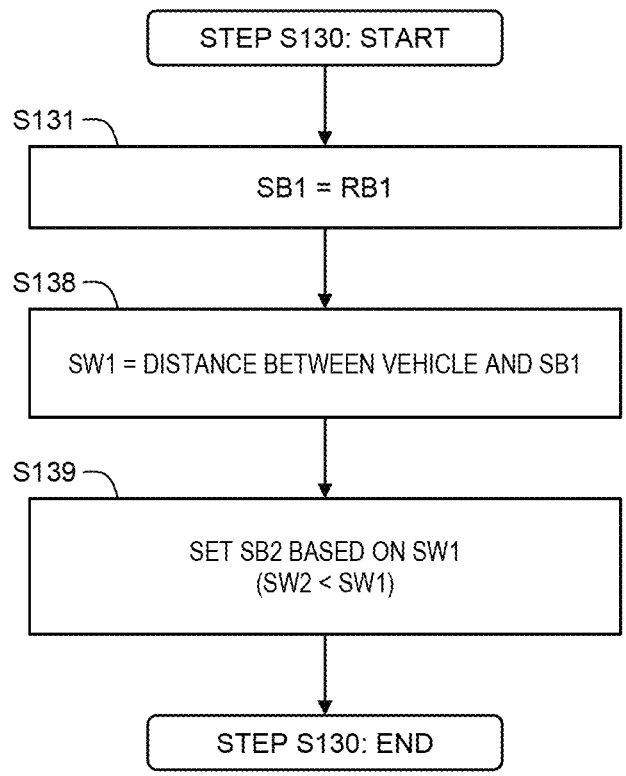
FIG. 19 is a flow chart showing an example of the assist area setting process according to the sixth embodiment of the present disclosure.

FIGS. 18 and 19 are a conceptual diagram and a flow chart showing an example of the assist area setting process (Step S130) according to the sixth embodiment, respectively.

In Step S131, the processor 110 sets the assist start boundary SB1 of the assist area SA at the position of the first roadway boundary RB1.

In subsequent Step S138, the processor 110 calculates a distance between the vehicle 1 and the first roadway boundary RB1 as the first assist width SW1. The first roadway boundary RB1 is the first lane edge line ME1 or the first road end object EG1. The position of the first lane edge line ME1 or the first road end object EG1 is obtained from the road configuration information 250. Therefore, the processor 110 is able to calculate the first assist width SW1 based on the road configuration information 250.

In Step S139, the processor 110 sets the assist end boundary SB2 of the assist area SA based on the first assist width SW1 obtained in Step S138. More specifically, the processor 110 sets the second assist width SW2 to be smaller than the first assist width SW1. For example, the processor 110 calculates the second assist width SW2 by multiplying the first assist width SW1 by a correction coefficient less than 1. Then, the processor 110 sets the assist end boundary SB2 at a position apart from the vehicle 1 (the vehicle end 2) toward the second side by the second assist width SW2.

6-3. Modification Example

Figure 20:
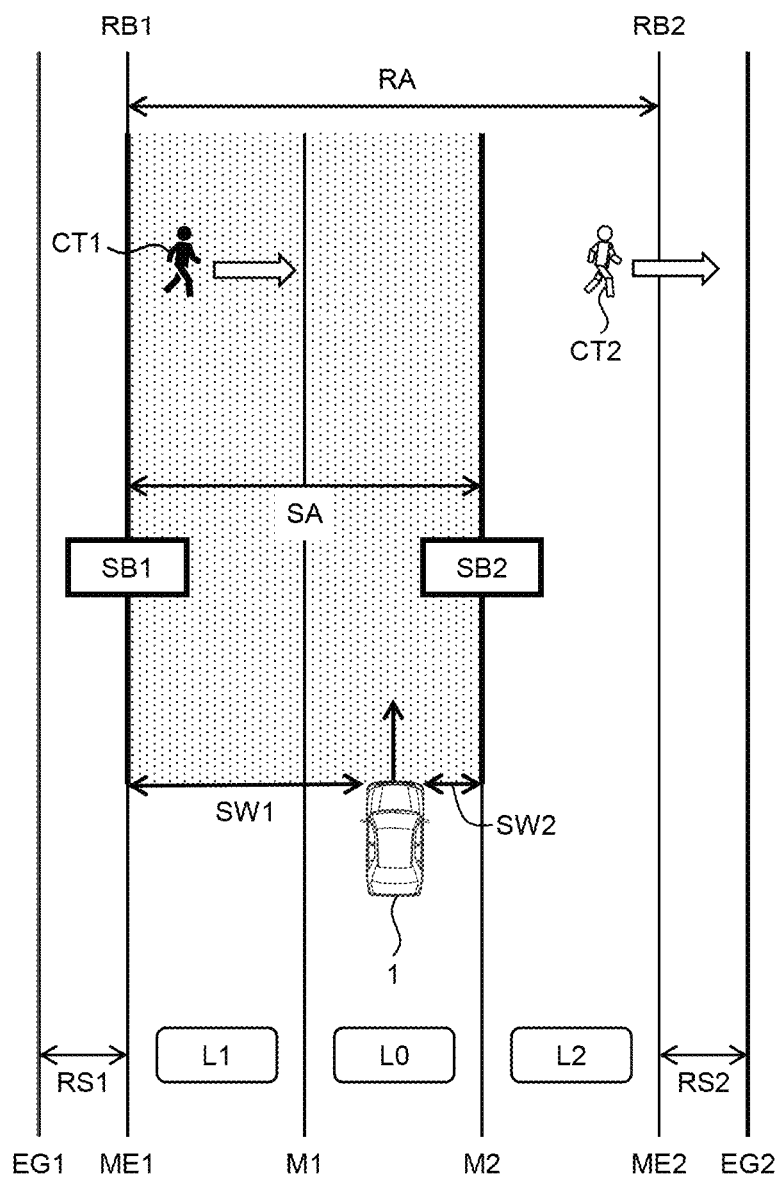
FIG. 20 is a conceptual diagram for explaining a modification example of the assist area setting process according to the sixth embodiment of the present disclosure.

FIG. 20 is a conceptual diagram for explaining a modification example of the assist area setting process according to the sixth embodiment. FIG. 20 shows the same situation as that shown in FIG. 7 (i.e., the first example in the first embodiment). The assist start boundary SB1 of the assist area SA is the first roadway boundary RB1 (i.e, the first lane edge line ME1), and is further away from the vehicle 1 than the first nearby lane marking M1 of the lane L0 is. On the other hand, the assist end boundary SB2 of the assist area SA is the second nearby lane marking M2 of the lane L0. Therefore, the second assist width SW2 is smaller than the first assist width SW1.

From the above, it can be said that the process flow shown in FIG. 9 is also applicable to the sixth embodiment. In particular, when another lane exists between the lane L0 and the first roadway boundary RB1, the second assist width SW2 becomes smaller than the first assist width SW1 by the process flow shown in FIG. 9.

Similarly, also in the situation shown in FIG. 11 (the second embodiment), the second assist width SW2 is smaller than the first assist width SW1. Therefore, the process flow shown in FIG. 12 can also be applied to the sixth embodiment.

What is claimed is:

1. A driving assist system that assists driving of a vehicle, the driving assist system comprising:
    a memory configured to store driving environment information indicating a driving environment for the vehicle; and
    a processor configured to execute driving assist control including at least one of deceleration control and steering control for avoiding a collision with a target ahead of the vehicle based on the driving environment information, wherein
    the driving assist control operates when the target exists within an assist area and does not operate when the target exists outside the assist area,
    a roadway area in which the vehicle exists is an area between a first roadway boundary located on a first side as viewed from the vehicle and a second roadway boundary located on a second side opposite to the first side as viewed from the vehicle,
    a crossing target is the target that crosses the roadway area ahead of the vehicle from the first side toward the second side,
    the assist area for the crossing target is an area between an assist start boundary located on the first side as viewed from the vehicle and an assist end boundary located on the second side as viewed from the vehicle,
    a first assist width is a distance between the vehicle and the assist start boundary,
    a second assist width is a distance between the vehicle and the assist end boundary, and the processor is further configured to set the assist area for the crossing target such that the second assist width is always smaller than the first assist width.

2. The driving assist system according to claim 1, wherein the processor is further configured to:
    set the assist start boundary at a position of the first roadway boundary;
    calculate a distance between the first roadway boundary and the vehicle as the first assist width, and
    set the assist end boundary based on the first assist width such that the second assist width is smaller than the first assist width.

3. The driving assist system according to claim 2, wherein the processor calculates the second assist width by multiplying the first assist width by a correction coefficient less than 1.

4. The driving assist system according to claim 1, wherein the second assist width is smaller than the first assist width regardless of a position of the vehicle.

5. The driving assist system according to claim 1, wherein a ratio between the first assist width and the second assist width is a fixed value.

* * * * *